(12) United States Patent
Lambright

(10) Patent No.: US 6,413,007 B1
(45) Date of Patent: Jul. 2, 2002

(54) JOINT ASSEMBLY

(75) Inventor: Michael D. Lambright, Archbold, OH (US)

(73) Assignee: Sauder Woodworking Co., Archbold, OH (US)

( * ) Notice: Subject to any disclaimer, the term of this patent is extended or adjusted under 35 U.S.C. 154(b) by 0 days.

(21) Appl. No.: 09/562,335

(22) Filed: May 1, 2000

(51) Int. Cl.[7] ................................................. B25G 3/00
(52) U.S. Cl. ....................................... 403/353; 403/381
(58) Field of Search ............................... 403/345, 360, 403/353, 380, 381, 383, 375

(56) References Cited

U.S. PATENT DOCUMENTS

| | | | |
|---|---|---|---|
| 1,214,261 A | * | 1/1917 | Balbach |
| 2,116,584 A | | 10/1938 | Shelby |
| 2,533,799 A | * | 12/1950 | Haydu |
| 4,012,155 A | * | 3/1977 | Morris |
| 4,138,094 A | | 2/1979 | Thir |
| 4,984,929 A | * | 1/1991 | Rock et al. |
| 5,090,835 A | | 2/1992 | Cox |
| 5,499,886 A | * | 3/1996 | Short et al. |

FOREIGN PATENT DOCUMENTS

| | | |
|---|---|---|
| FR | 1.148.478 | 6/1957 |
| FR | 1.236.806 | 6/1960 |
| FR | 2.267.469 | 12/1975 |
| WO | WO 92/19874 | 11/1992 |

* cited by examiner

Primary Examiner—Lynne H. Browne
Assistant Examiner—Tomlyne A Malcolm
(74) Attorney, Agent, or Firm—Emch, Schaffer, Schaub & Porcello Co., L.P.A.

(57) ABSTRACT

A joint assembly for furniture members including a first member having a tongue including a first side extending outwardly from a first edge at a first predetermined angle with respect to the first edge and a second side extending outwardly from the first edge at a second predetermined angle with respect to the first edge. The tongue includes a projection positioned adjacent to the second side. The second member includes a groove having first and second walls and at least one cavity for receiving the tongue of the first member.

7 Claims, 5 Drawing Sheets

JOINT ASSEMBLY

BACKGROUND OF THE INVENTION

The present invention relates generally to a joint assembly. More specifically, the invention is directed to a tongue and groove joint assembly for use with furniture.

Ready-to-assemble (RTA) furniture is furniture that is manufactured in pieces for subsequent assembly by a consumer of the furniture. In the past, RTA furniture members have been joined together by various bracket assemblies. The use of brackets can sometimes cause difficulties in the joining together of the furniture members.

It has been found that there is a need for a joint assembly that can quickly and easily joint together RTA furniture members. The present invention satisfies this need.

SUMMARY OF THE INVENTION

The joint assembly of the present invention includes a first member having a first edge. The first member includes a tongue positioned on the first edge having a first side and a second side. The first side extends outwardly from the first edge at a first predetermined angle with respect to the first edge. The second side extends outwardly from the first edge at a second predetermined angle with respect to the first edge. The tongue includes a projection positioned adjacent to the second side.

The joint assembly includes a second member having a second edge adapted for engagement with the first edge. The second member includes a groove having a first wall and a second wall. The first and second walls extend inwardly from the second edge in spaced relationship to one another. At least one of the first and second walls includes a cavity adapted for engagement with the projection when the tongue is positioned in the groove to form the joint assembly.

The primary object of the present invention is to provide a joint assembly for quickly and easily joining together two furniture members.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
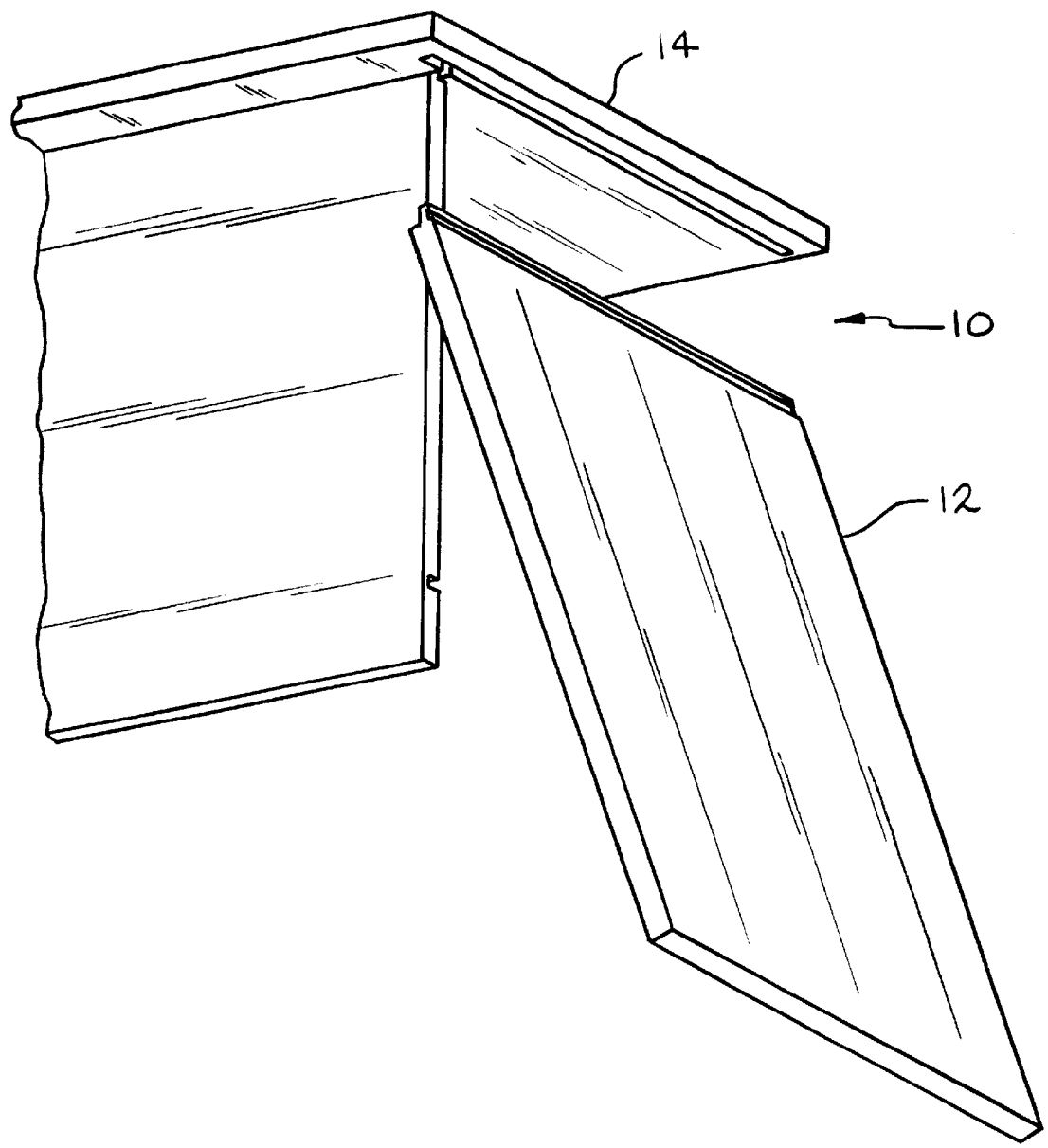
FIG. 1 is a perspective view of a first member and a second member of a furniture unit prior to being joined together by a joint assembly according to the present invention.

The preferred embodiments and best mode of the present invention will now be described in detail with reference being made to the drawings. In the drawings, the joint assembly of the present invention is indicated generally by the reference number "10".

Figure 2:
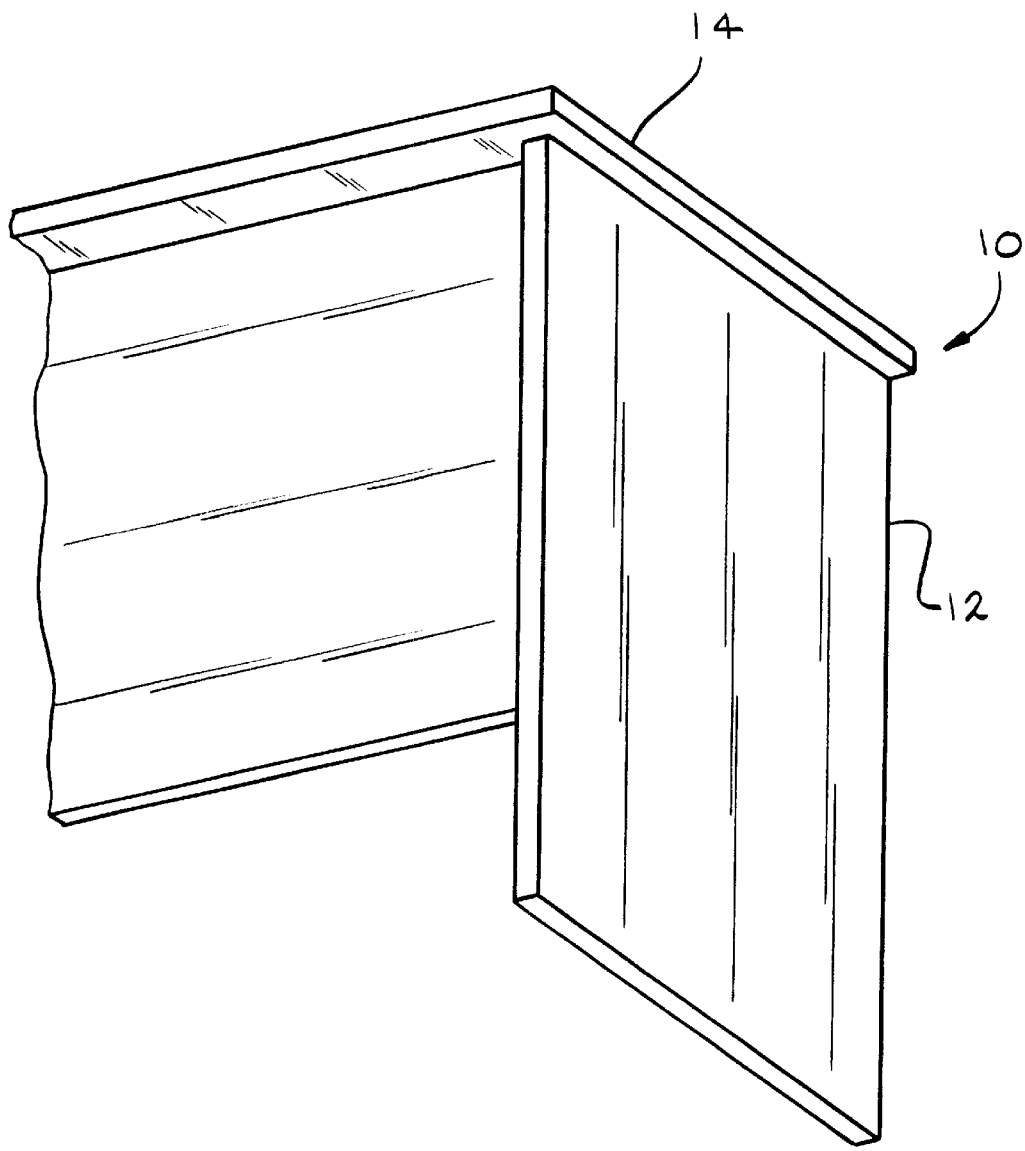
FIG. 2 is a view similar to the view of FIG. 1 showing the first and second members being joined together by the joint assembly of the present invention.

Referring to FIGS. 1 and 2, the assembly 10 is used to join a first member 12 to a second member 14. By way of example, the first member 12 can be the side of a desk and the second member 14 can be the top of a desk. However, it should be understood that the first and second members 12 and 14 can be a variety of furniture members. As shown in FIGS. 1 and 2, the assembly 10 of the present invention can quickly and easily join together the first and second members 12 and 14 without the use of brackets.

Figure 3:
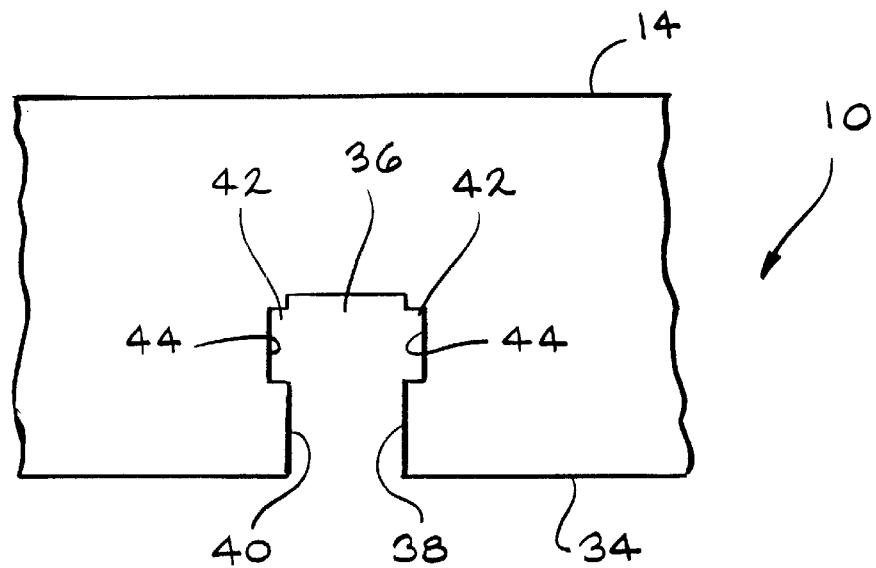
FIG. 3 is a detailed, cross-sectional view of the joint assembly according to the present invention.
Figure 3:
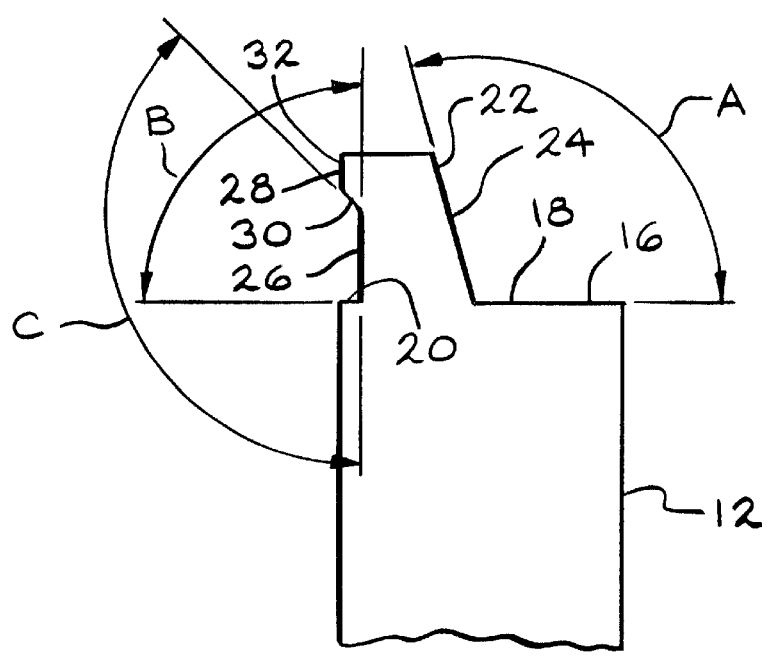

Referring now to FIG. 3, the first member 12 has a first edge 16 including a major portion 18 and a minor portion 20. The first member 12 includes a tongue 22 having a first side 24 and a second side 26. The first side 24 extends outwardly from the major portion 18 of the first edge 16 at a predetermined angle A with respect to the major portion 18. The angle A is in the range from about 95° to about 110°, with an obtuse angle of 103° being preferred. As shown in FIG. 3, the second side 26 of the tongue 22 extends outwardly from the minor portion 20 of the first edge 16 at a predetermined angle B with respect to the minor portion 20. The angle B is in the range from about 85° to about 95°, with a right angle of 90° being preferred.

Still referring to FIG. 3, the tongue 22 includes a projection 28 positioned adjacent to the second side 26. The projection 28 includes a first projection surface 30 extending outwardly from the second side 26 at a predetermined angle C with respect to the second side 26. The angle C is in the range from about 125° to about 145°, with an obtuse angle of 135° being preferred. As shown in FIG. 3, the projection 28 includes a second projection surface 32 that is generally parallel to the second side 26 of the tongue 22.

As shown in FIG. 3, the second member 14 has a second edge 34 that is adapted for engagement with the first edge 16 of the first member 12. The second member 14 includes a groove 36 having a first wall 38 and a second wall 40. The first and second walls 38 and 40 extend inwardly from the second edge 34 in a spaced and generally parallel relationship to one another. The first and second walls 38 and 40 are spaced from one another to allow for the insertion of the tongue 22 in the groove 36 as described below. Each of the first and second walls 38 and 40 is adapted for engagement with the second side 26 of the tongue 22. As shown in FIG. 3, each of the first and second walls 38 and 40 includes a cavity 42 adapted for engagement with the projection 28 of the tongue 22. The cavity 42 includes a cavity surface 44 that is adapted for engagement with the second projection surface 32 of the tongue 22.

Figure 4:
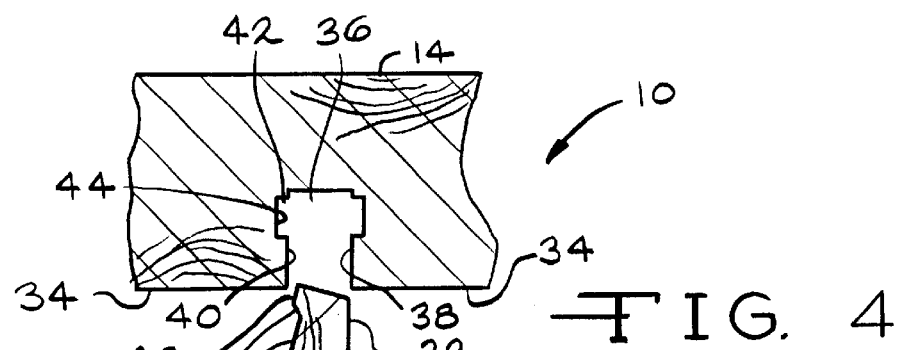
FIG. 4 is a detailed, cross-sectional view showing the first member being positioned with respect to the second member prior to joining by the joint assembly.
Figure 5:
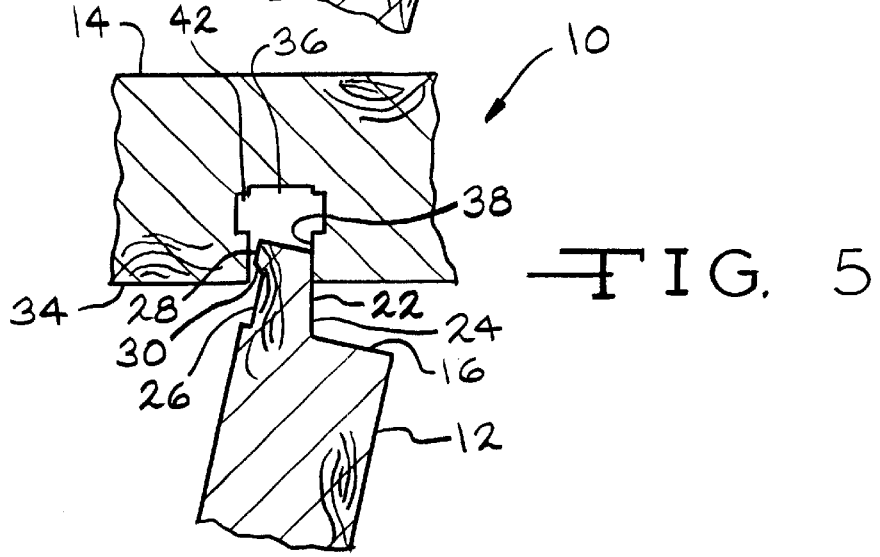
FIG. 5 is a view similar to the view of FIG. 4 showing the tongue of the present invention partly inserted in the groove of the present invention.
Figure 6:
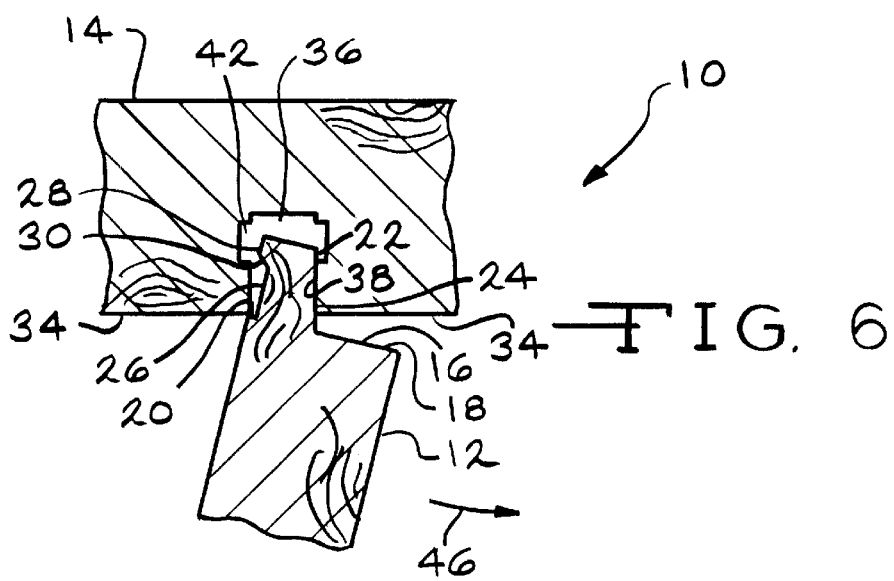
FIG. 6 is a view similar to the view of FIG. 4 showing the tongue partly inserted in the groove.
Figure 7:
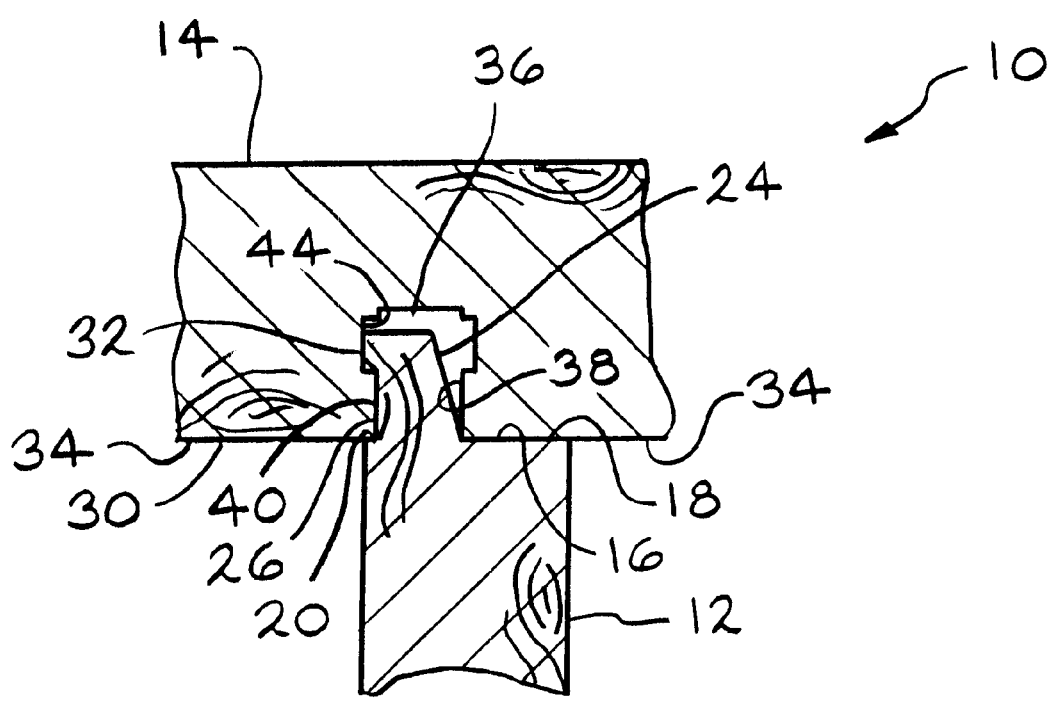
FIG. 7 is a view similar to the view of FIG. 4 showing the tongue fully inserted in the groove to form the joint assembly according to the present invention.

The forming of the joint assembly 10 is shown in FIGS. 4–7. As shown in FIG. 4, the first member 12 is positioned at an angle with respect to the second member 14 so that the tongue 22 is aligned with the groove 36. As shown in FIG. 5, the first side 24 is positioned adjacent to the first wall 38 as the tongue 22 is inserted in the groove 36. Referring to FIG. 6, as the tongue 22 is inserted in the groove 36, the minor portion 20 of the first edge 16 engages the second edge 34 of the second member 14. The first member 12 is then moved in the direction indicated by arrow 46 in FIG. 6. As shown in FIG. 7, the movement of the first member 12 with respect to the second member 14 causes the major and minor portions 18 and 20 of the first edge 16 to engage the second edge 34. The second side 26 of the tongue 22 engages the second wall 40. The second projection surface 32 of the projection 28 engages the cavity surface 44 of the cavity 42. As it will be appreciated, the positioning of the first side 24, the second side 26 and the first projection surface 30 as defined by the angles A, B and C, respectively, allows the tongue 22 to be quickly and easily inserted in the groove 36 to form the joint assembly 10.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A joint assembly comprising:

a first member having a first edge, said first member including a tongue having a first side and a second side, said first side extending outwardly and continuously from said first edge at a first predetermined obtuse angle with respect to said first edge, said second side extending outwardly from said first edge at a second predetermined generally right angle with respect to said first edge, said tongue including a projection positioned adjacent to said second side, said projection including a first projection surface extending outwardly from said second side at a third predetermined obtuse angle with respect to said second side, said projection including a second projection surface adjacent to said first projection surface, said second projection surface being substantially parallel to said second side of said tongue; and a second member having a second edge engaging said first edge, said second member including a groove having a first wall and a second wall, said first and second walls extending inwardly from said second edge in spaced relationship to one another, at least one of said first and second walls including a cavity having a cavity surface engaging said second projection surface of said projection when said tongue is positioned in said groove to form said joint assembly.

2. The joint assembly of claim 1, wherein said first edge includes a major portion and a minor portion, said major portion being positioned adjacent to said first side of said tongue and said minor portion being positioned adjacent to said second side of said tongue.

3. The joint assembly of claim 1, wherein said first predetermined obtuse angle is in the range from about 95° to about 110°.

4. The joint assembly of claim 1, wherein said second predetermined generally right angle is in the range from about 85° to about 95°.

5. The joint assembly of claim 1, wherein said third predetermined obtuse angle is in the range from about 125° to about 145°.

6. The joint assembly of claim 1, wherein said first wall is generally parallel to said second wall.

7. The joint assembly of claim 1, wherein at least one of said first and second walls is adapted for engagement with said second side of said tongue.

* * * * *